May 5, 1953  J. H. TERRESON  2,637,554
MECHANICAL HOBBYHORSE

Filed Dec. 13, 1950  2 SHEETS—SHEET 1

INVENTOR
JAMES H. TERRESON

BY Ralph B. Stewart
ATTORNEY

May 5, 1953     J. H. TERRESON     2,637,554
MECHANICAL HOBBYHORSE

Filed Dec. 13, 1950     2 SHEETS—SHEET 2

INVENTOR
JAMES H. TERRESON

BY *Ralph B. Stewart*

ATTORNEY

Patented May 5, 1953

2,637,554

UNITED STATES PATENT OFFICE 2,637,554

MECHANICAL HOBBYHORSE

James Henry Terreson, Pascagoula, Miss.

Application December 13, 1950, Serial No. 200,629

4 Claims. (Cl. 272—53.1)

This invention relates to an amusement device, or exercising device, or the class wherein an object which may be formed in simulation of an animal, and which may function as a seat for a rider, is made to move in a manner generally simulating the galloping movement of a horse or other quadruped.

It has heretofore been known to provide such devices where, as in the instant invention, the animal figure or other object is carried by a rockably mounted or oscillating rod or member.

In some of these prior constructions however, the animal figure has simply been oscillated or rocked through a path of constant radius about a given axis of oscillation, in which case it has been necessary to provide some special arrangement for increasing the speed of the forward movement of the figure relative to the speed of its rearward movement in order both to simulate the galloping motion of an animal and to convey the impression of forward motion.

It has also been known in amusement devices to operatively connect one end of the supporting rod or member to a rotating crank, leaving the balance of the rod free to move eccentrically or erratically within predetermined limits, so that an animal figure carried by said rod will move in an erratic and unpredictable path. Obviously such a device is not suitable for use by a human rider, nor does it simulate a galloping motion.

With the foregoing in mind, it is a primary object of the instant invention to mount the said figure or object on a rigid supporting rod or member for oscillating or swinging movement with said member about a fixed axis, but in a path of constantly changing radius, the arrangement being such that the radius of the path of movement traversed by the figure and hence the distance traversed is relatively greater during its forward movement than during its return or rearward movement, the result being that the figure appears to be galloping forward in a more accurate and realistic simulation of the galloping motion of a horse or other quadruped than has been heretofore attainable.

It is an additional object to provide such an arrangement in which the speed of forward movement is substantially greater than the return or rearward speed, to further the impression of a galloping motion.

Other incidental objects and advantages will be readily apparent in the following detailed description.

Figure 1:
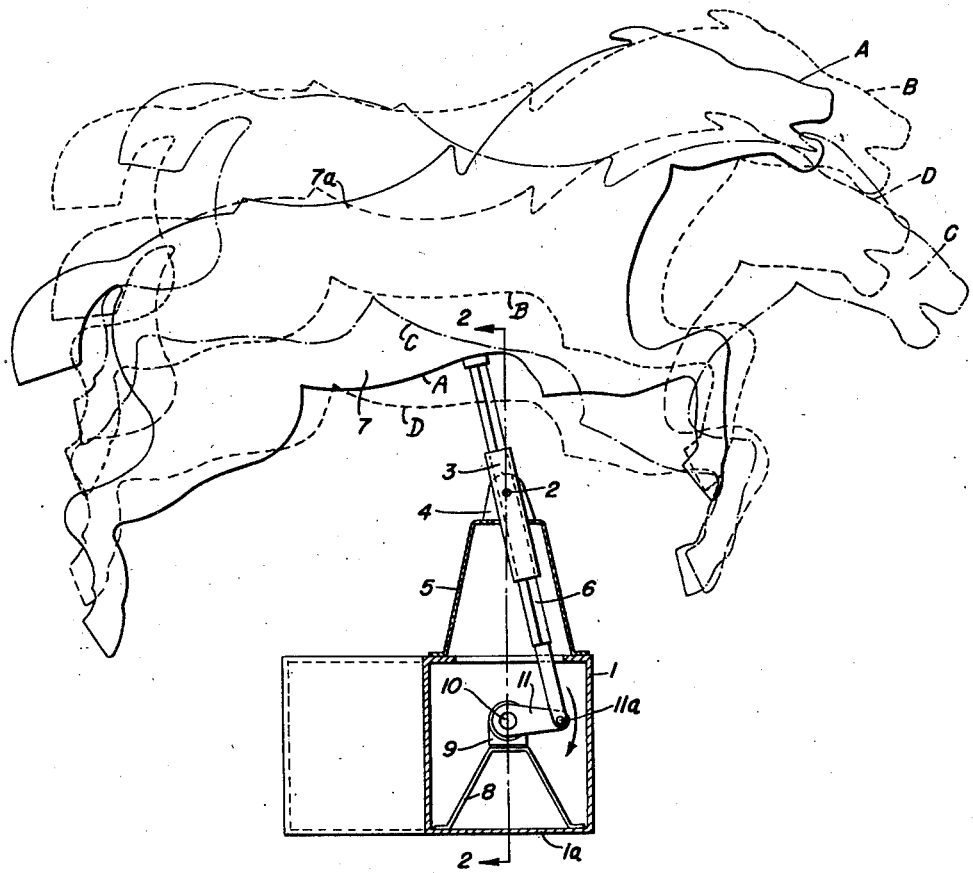
Figure 5:
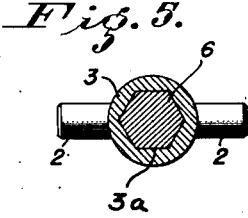
Figure 4:
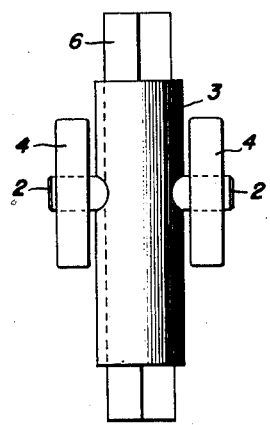
Figure 2:
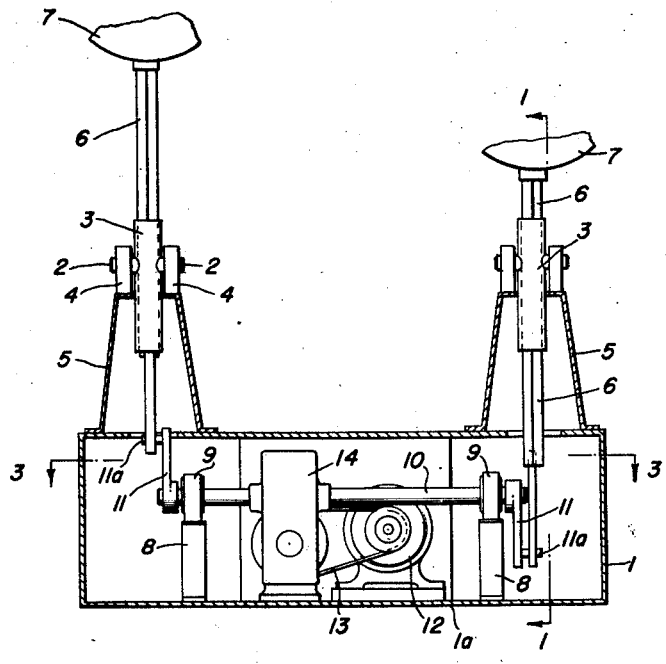
Figure 3:
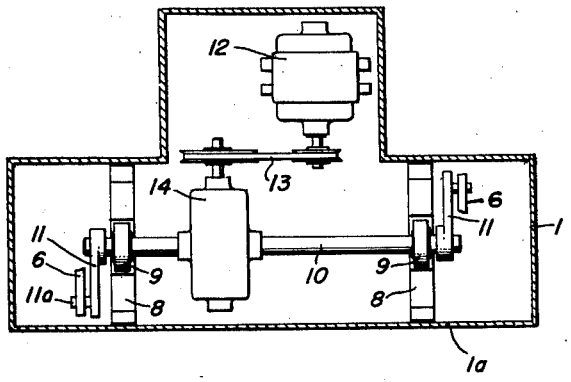

In the accompanying drawings:

Figure 1 represents a vertical section through the preferred embodiment of the invention taken along the line 1—1 of Figure 2 looking in the direction of the arrows, and showing in broken lines various of the positions which are assumed by the animal figure at different stages in its cycle of operation;

Figure 2, a section on the line 2—2 of Figure 1, looking in the direction of the arrows, the animal figures being shown only fragmentarily;

Figure 3, a cross section through the hollow base or housing, taken on the line 3—3 of Figure 2 looking downwardly, and showing in plain view the several working parts within said housing;

Figure 4, an enlarged detail front elevation of one of the rockably mounted guide bearings or guides and its mounting means, a section of the plunger being slidably disposed therethrough; and Figure 5, a cross-section through said guide and plunger, similarly enlarged, looking axially toward the trunnions or pivots of the guide.

In general the invention comprises a slide bearing or guide mounted for oscillation about a horizontal axis, a rigid plunger or rod carrying the animal figure or other object and slidable through said guide transversely to its axis of oscillation, and means such as a crank operatively associated with the lower end of the plunger to produce movement thereof in a substantially circular path about an axis parallel to the axis of oscillation of the guide.

While only one such movable animal figure or object and its associated mechanism is essential to the invention, I have included a pair of such figures in the preferred embodiment illustrated in the accompanying drawings.

Referring now in detail to the drawings, the preferred embodiment of the invention utilizes a hollow base 1 which serves as an enclosed housing for various parts of the machine and also functions as a rigid support for other parts. To this end the base 1 may be formed of any suitable material such as wood or metal having the desired strength and rigidity.

Mounted on the base 1 for oscillation about horizontal axes are two tubular slide bearings or guides 3, each having a guide opening therethrough arranged transversely to its axis of oscillation. Where more than one such bearing or guide 3 is utilized, all of such guides will be disposed with their axes of oscillation in parallel and preferably in aligned relation, as shown.

In the present embodiment, the axis of oscillation of each said guide 3 is defined by oppositely projecting pivots or trunnions 2—2 rigidly carried by said guide and journalled in a suitable trunnion cradle formed by horizontally opposed bearings 4—4 secured on a hollow pedestal 5 on the base or housing 1.

Slidably disposed through each such guide 3 is an elongated rigid plunger or rod 6 the lower end of which projects into the interior of hollow base 1 through an opening in the top of said pedestal and an opening in the top of said base 1. Rigidly carried at the upper externally projecting end of each said plunger 6 is an object such as an animal figure 7 in the form of a galloping horse. Preferably the figure 7 is capable of functioning as a seat for a rider or passenger, and to this end is formed or provided with a saddle 7a (see Figure 1). Such a figure 7 may be formed of any usual rigid material, such as wood, reinforced plaster, metal or the like.

In order to counteract any forces tending to rotate or twist the animal figure 7 about the longitudinal axis of its supporting plunger 6, it is desirable to form the plunger and its receptive guide opening 3a in the guide 3 of hexagonal or other non-round cross section, as is best shown in Figure 5. This will prevent the transmission of torsional forces through the plungers to their pivotal connections with the cranks or other actuating mechanisms hereinafter described.

Rigid brackets 8—8 secured on the bottom plate 1a within the housing 1 support relatively horizontally spaced bearings 9—9 in which is rotatably journalled a crank shaft 10 with its rotational axis beneath and parallel to the axes of oscillation of the respective guides 3. Cranks 11—11 carried at opposite ends of said crankshaft are pivotally connected to the lower ends of the respective plungers 6—6 as by the crank pins 11a—11a. Preferably the cranks 11—11 will be in balanced or relatively angularly opposed relation, whereby the plungers 6—6 will be caused to move in opposite vertical directions at any given moment and thus balance each other.

Rotation of the crank shaft 10, preferably at a constant speed, may be produced in any suitable manner. To this end I prefer to utilize an electric motor 12 housed within the hollow base 1 and connected in driving relation through a belt 13 with a speed reduction gear system 14 which, in turn, is connected in driving relation with crank shaft 10, as is best illustrated in Figures 2 and 3.

Obviously the crankshaft 10 and its associated driving motor 12 merely exemplify one of several equivalent means which might be employed for rotating the lower ends of the plungers 6—6 in generally circular or endless paths about axes parallel to their respective axes of oscillation.

In the operation of the invention, the motor 12 is energized to rotate the crank shaft 10 in the direction indicated by the arrow in Figure 1. Such rotation will cause a corresponding rotary movement of the lower ends of the plungers 6—6 and a resultant reciprocating movement of each plunger 6 through its guide 3 together with a simultaneous oscillating movement of each said plunger 6 about the axis of trunnions 2—2.

As the crank 11 associated with each plunger 6 rotates through the upper half or 180 degrees of its circular path, the plunger 6 will be projected upwardly through the guide 3 to increase the radius of oscillation of its upper end and consequently increase the length of the path traversed by the figure 7 during forward motion of the latter.

By way of illustration, in Figure 1, the animal figure 7 is shown in solid lines in the position A which it assumes at the inception of its forward motion, at which time it is in a horizontally inclined position with the forelegs of the animal figure raised and the rear legs thereof lowered as if just leaving the ground. At the mid-point of its forward motion, as indicated by the broken line position B in Figure 1, the figure 7 will be substantially horizontal, and at the end of such forward motion or movement will be again horizontally inclined as indicated by the broken line position C in Figure 1, with its forelegs lowered as if about to land on the ground and its rear legs raised.

However, as the crank 11 swings through the lower half of its rotational path, the plunger 6 will be retracted through the guide 3 to decrease the radius of oscillation of the figure 7 during its return movement, with a consequent decrease in the length of the path traversed by said figure during its return or rearward movement, all as will be apparent from the broken line view D in Figure 1 showing the animal figure 7 at the midpoint of its rearward or return movement.

Since the cranks 11 will be rotating normally at a constant speed, necessitating that each relatively long path of forward movement of each figure 7 be traversed in the same time as its relatively shorter path of rearward movement, this will result in the forward movement being accomplished at a greater speed than the rearward movement. Thus the relatively greater distance traversed by each figure 7 during each of its forward movements, and the relatively greater speed thereof, as compared to its rearward movements, will give the rider the sensation of a forward galloping action.

Also, the oscillating movement of the figure 7 about the trunnions 2—2 will cause the figure to be tilted upwardly at the inception of each forward movement and downwardly at the end thereof, as explained, in realistic simulation of the motions of a galloping quadruped, which commences each stride by leaping forward off its rear legs and ends by landing on its forelegs.

Having thus described my invention, I claim:

1. An amusement and exercising machine comprising an enclosed rigid housing, a pair of brackets mounted in horizontally spaced relation within said housing, aligned bearings carried by said brackets, a crank shaft rotatably journalled in said bearings for rotation about a horizontal axis, means for rotating said shaft comprising an electric motor and speed reduction gearing operatively connecting said motor to said shaft, said shaft having a pair of oppositely directed cranks mounted on the ends thereof, a trunnion cradle supported on said housing above each of said cranks, tubular guides having laterally extending trunnions supported in said respective cradles for oscillation about aligned horizontal axes, a rigid plunger slidably arranged within each of said guides, the lower ends of said plungers projecting into said housing and being operatively connected with said respective cranks to receive circular movement therefrom, and an animal figure carried directly by the upper exterior end of each of said plungers, whereby the movement imparted to said plungers by the action of their respective cranks and guides will produce movement of said figures in a manner closely resembling the galloping action of a quadruped.

2. An amusement and exercising machine comprising an enclosed rigid housing, a pair of brackets mounted in horizontally spaced relation within said housing, aligned bearings carried by said brackets, a crank shaft journalled in said bearings for rotation about a horizontal axis, means for rotating said shaft, said shaft having a crank projecting radially therefrom, a trunnion cradle supported on said housing above said crank, a tubular guide having laterally extending trunnions supported in said cradle for oscillation about an axis parallel to the rotational axis of said crank shaft, a rigid plunger slidably arranged within said guide, the lower end of said plunger projecting into said housing and being pivotally connected with said crank to receive circular movement therefrom, and an animal figure carried directly by said plunger above said guide, whereby the movement imparted to said figure by the combined action of said crank shaft and guide will produce movement of the figure in a manner closely resembling the galloping movement of a horse.

3. An amusement machine comprising a hollow supporting base, a crankshaft having a crank thereon, means supporting said shaft within said base for rotation about a horizontal axis, means for rotating said crank shaft, horizontally spaced bearings and means supporting said bearings on said base above said crank shaft, a plunger guide having oppositely extending trunnions supported in said bearings for oscillation of the guide about an axis parallel to that of the crankshaft, a rigid plunger positioned within said guide for reciprocation transversely to the axis of oscillation thereof, one end of said plunger projecting into said hollow base, means connecting the lower end of said plunger with said crank to receive circular movement therefrom, and a seat carried directly by the other end of said plunger above said guide, whereby the combined reciprocating and oscillating movement imparted to said plunger in operation will produce movement of said seat in a manner closely resembling the galloping motion of a horse.

4. An exercising machine comprising a supporting base, a crankshaft supported on said base for rotation about a horizontal axis and carrying a crank thereon, means for rotating said crankshaft, horizontally spaced bearings and means supporting said bearings on said base above said crank shaft, a plunger guide having oppositely extending trunnions supported in said bearings for oscillation of the guide about an axis parallel to that of the crankshaft, a rigid plunger positioned within said guide for reciprocation transversely to the pivotal axis thereof, one end of said plunger projecting below said guide, means connecting the lower end of said plunger to said crank to receive circular movement therefrom, and a passenger seat carried directly by the other end of said plunger above said guide, whereby the combined reciprocating and oscillating movement imparted to said plunger in operation will produce movement of said seat in a manner closely resembling the galloping motion of a horse.

JAMES HENRY TERRESON.

References Cited in the file of this patent

UNITED STATES PATENTS

| Number | Name | Date |
| --- | --- | --- |
| 218,141 | Schlueter | Aug. 5, 1879 |
| 238,839 | Bond | Mar. 15, 1881 |
| 1,791,777 | Webb | Feb. 10, 1931 |
| 1,863,012 | Hahs | June 14, 1932 |
| 2,107,449 | Marlowe | Feb. 8, 1938 |